US006360025B1

(12) United States Patent
Florent

(10) Patent No.: US 6,360,025 B1
(45) Date of Patent: Mar. 19, 2002

(54) IMAGE PROCESSING METHOD FOR REDUCING THE NOISE IN AN IMAGE OF A SEQUENCE OF THREE TEMPORAL IMAGES, AND MEDICAL IMAGING APPARATUS FOR CARRYING OUT SUCH A METHOD

(75) Inventor: Raoul Florent, Valenton (FR)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/218,549

(22) Filed: Dec. 22, 1998

(30) Foreign Application Priority Data

Dec. 23, 1997 (FR) .............................................. 97 16309

(51) Int. Cl.⁷ .............................. G06T 5/50; G06T 5/20; G06K 9/40; H04N 5/213; H04N 5/217
(52) U.S. Cl. ........................ 382/261; 382/262; 382/264; 348/620; 348/607
(58) Field of Search .................................. 382/261, 262, 382/260, 264, 275, 107; 348/607, 620, 619, 618

(56) References Cited

U.S. PATENT DOCUMENTS

| 5,909,515 A | * 6/1999 | Makram-Ebeid ............. 382/260 |
| 5,911,012 A | * 6/1999 | Bernard et al. .............. 382/260 |
| 6,037,986 A | * 3/2000 | Zhang et al. ................ 348/409 |
| 6,151,417 A | * 11/2000 | Florent ....................... 382/265 |
| 6,154,519 A | * 11/2000 | Florent et al. ................ 378/62 |
| 6,281,942 B1 | * 8/2001 | Wang ......................... 348/607 |

FOREIGN PATENT DOCUMENTS

| EP | 0 512 422 B1 | * 11/1992 | ............ H04N/5/21 |
| EP | 0 578 311 A2 | * 1/1994 | ............ H04N/5/21 |

OTHER PUBLICATIONS

"A system for the removal of Impulsive Noise in image sequences", Kokaram A. C. et al, Proceedings of the SPIE, vol. 1818, No. 1, Jan. 1, 1992, pp. 322–331.*
"A new class of Detail–Preserving Filters for Image Processing" by Ari Nieminen, Poekka Heinonen, and Yrjo Neuvo in IEEE Transactions on Pattern Analysis and Machine Intelligence, vol. PAMI–9, No. 1, Jan. 1987.

* cited by examiner

Primary Examiner—Scott Rogers
(74) Attorney, Agent, or Firm—John Vodopia

(57) ABSTRACT

This invention relates to an image processing method for filtering pixels of an image in a temporal sequence of successive images. At each pixel of the images, spatially smoothed intensities are determined, and the spatially smoothed intensities of a center image are tested relative to the smoothed intensities of its preceding and its succeeding images. If a spatially smoothed central intensity at a pixel substantially deviates from the intensities in the preceding and succeeding images at that pixel, the filtered intensity of that central pixel is assigned as the spatially smoothed intensity of the center image. If not, the filtered intensity of that pixel is assigned as a further temporal filtering of the three spatially smoothed intensities. The invention also relates to an apparatus, in particular a medical x-ray imaging apparatus, for carrying out the image processing method.

12 Claims, 6 Drawing Sheets

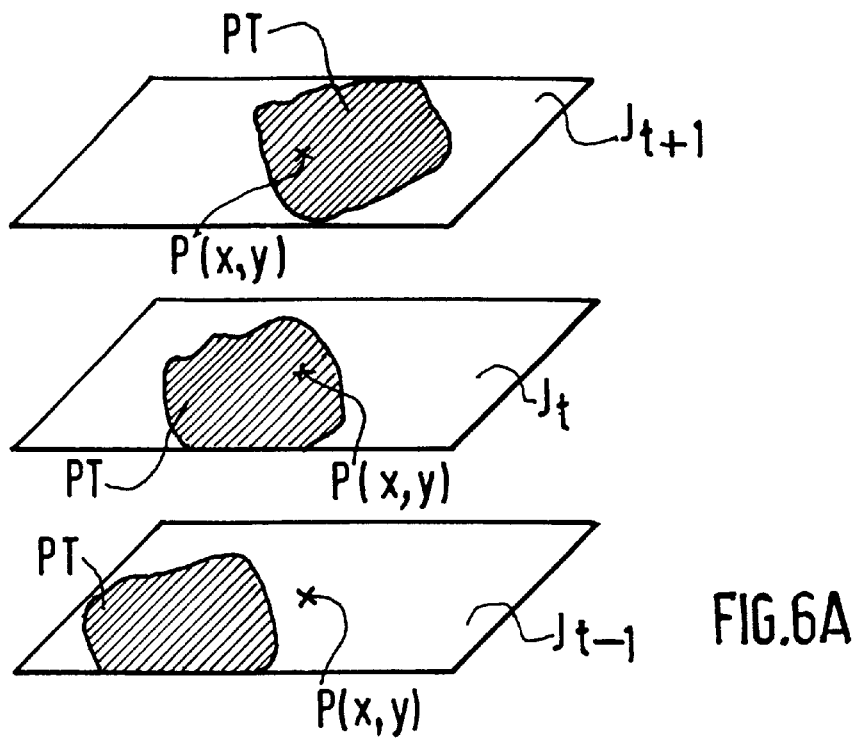
FIG.6A
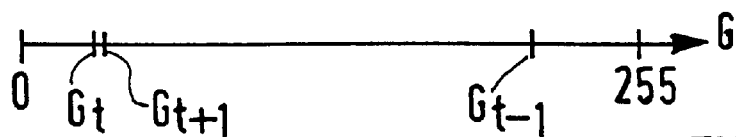
FIG.6B
| AND | 0 | 1 |
|---|---|---|
| 0 | 0 | 0 |
| 1 | 0 | 1 |
FIG.7

IMAGE PROCESSING METHOD FOR REDUCING THE NOISE IN AN IMAGE OF A SEQUENCE OF THREE TEMPORAL IMAGES, AND MEDICAL IMAGING APPARATUS FOR CARRYING OUT SUCH A METHOD

BACKGROUND OF THE INVENTION

1. Field of the Invention

The invention relates to an image processing method for reducing the noise in an image, including the determination of three temporal intensities relating to a current pixel in the same location in three successive images in a sequence, the image to be processed being the central image of the sequence. The invention also relates to a medical apparatus which includes such a system.

The method is applied so as to reduce the noise in a sequence of images while preserving the small details of objects in motion. Small details are to be understood to mean herein objects of from 1 to some pixels, for example from 1 to 10 pixels. The invention can be used particularly for the processing of video images, notably medical images.

2. Description of Related Art

An image processing method for reducing the noise while preserving small details is already known from the publication "A new class of Detail-Preserving Filters for Image Processing" by ARI NIEMINEN, PEKKA HEINONEN, and YRJO NEUVO in IEEE TRANSACTIONS ON PATTERN ANALYSIS AND MACHINE INTELLIGENCE, VOL.PAMI-9, N°1, JANUARY 1987, pages 74–90. The cited document describes, in a general manner, two-dimensional spatial filters which include a median which is applied to a structure with a finite impulse response called FMH-2D (the letter F stands for FIR or Finite Impulse Response; M stands for Median, H stands for Hybrid; 2D stands for two-dimensional). Referring notably to FIG. 4 and section II-C of the cited document, a Finite Impulse Response (FIR) filter of the type FMH-2D comprises four small linear masks, each of which consists of two pixels which form four branches which are arranged at an angle of 90° around a current pixel in the plane of the image. The filtering includes a step for averaging the intensity of the two pixels in the small masks, and a step for classifying the mean intensities obtained in the four branches and the intensity of the central current pixel by a median which performs the selection of one of these intensities. Another filter, called a FMH-1D filter and described with reference to FIG. 2 and in section II-B, involves one or several median levels. The FMH-1D filter involves two elementary masks, arranged in a single direction in the plane, and the realization of a median over the mean intensities in the masks and the intensity of the central current pixel. A problem is encountered in that these exclusively spatial filters produce exclusively an average noise reduction, so that they still leave behind noise patches and noise patterns.

SUMMARY OF THE INVENTION

It is an object of the invention to provide an image processing method which includes a filtering operation which provides an improved noise reduction without noise patches and noise patterns in the movements and which notably does not erase the small details of moving objects in a sequence of images.

This object is achieved by means of an image processing method including determination of three temporal intensities relating to a current pixel in the same location (x,y) in three successive images ($J_{t-1}$, $J_t$, $J_{t+1}$,) in a sequence, the image to be processed being the central image ($J_t$) of the sequence, which method also includes the following steps: testing of said three temporal intensities ($G_{t-1}$, $G_t$, $G_{t+1}$), previously smoothed for noise peaks, in order to distinguish a first case in which the smoothed temporal intensity ($G_t$) in the central image ($J_t$) is substantially different from the other two smoothed temporal intensities ($G_{t-1}$, $G_{t+1}$) from a second case in which the smoothed temporal intensity ($G_t$) in the central image ($J_t$) is substantially equal to at least one of the other two smoothed temporal intensities ($G_{t-1}$, $G_{t+1}$), and assignment of a noise filtered intensity ($R_t$) to the current pixel in the central image ($J_t$) which in the first case is directly the smoothed temporal intensity ($G_t$) at the current pixel in the central image and which in the second case is the result of a median filter applied to the three smoothed temporal intensities ($G_{t-1}$, $G_t$, $G_{t+1}$) in the second case.

An advantage of the method consists in that it is not very complex: it is merely necessary to define one parameter, being the number of pixels in the elementary mask of the filter FMH and the threshold.

A medical imaging apparatus which includes means for carrying out this method is defined in claim 8. In the fluoroscopy mode this apparatus enables on-line tracking of very delicate operations, utilizing very small tools, with an image quality and preservation of the movement of the small tools which could otherwise be achieved only by means of a much higher radiation dose which would be detrimental to the patient and to the radiologist.

BRIEF DESCRIPTION OF THE DRAWINGS

The invention will be described in detail hereinafter with reference to the accompanying diagrammatic drawings; therein:

FIG. 6A shows three successive images of a sequence of images which contain a moving object in the form of a "plateau", and FIG. 6B shows the classification of the intensities relating to the images of FIG. 6A for the selection by a median;

FIG. 7 shows the effect of the logic AND-gate on the signals selecting the intensities;

DESCRIPTION OF THE PREFERRED EMBODIMENTS

Figure 1A:
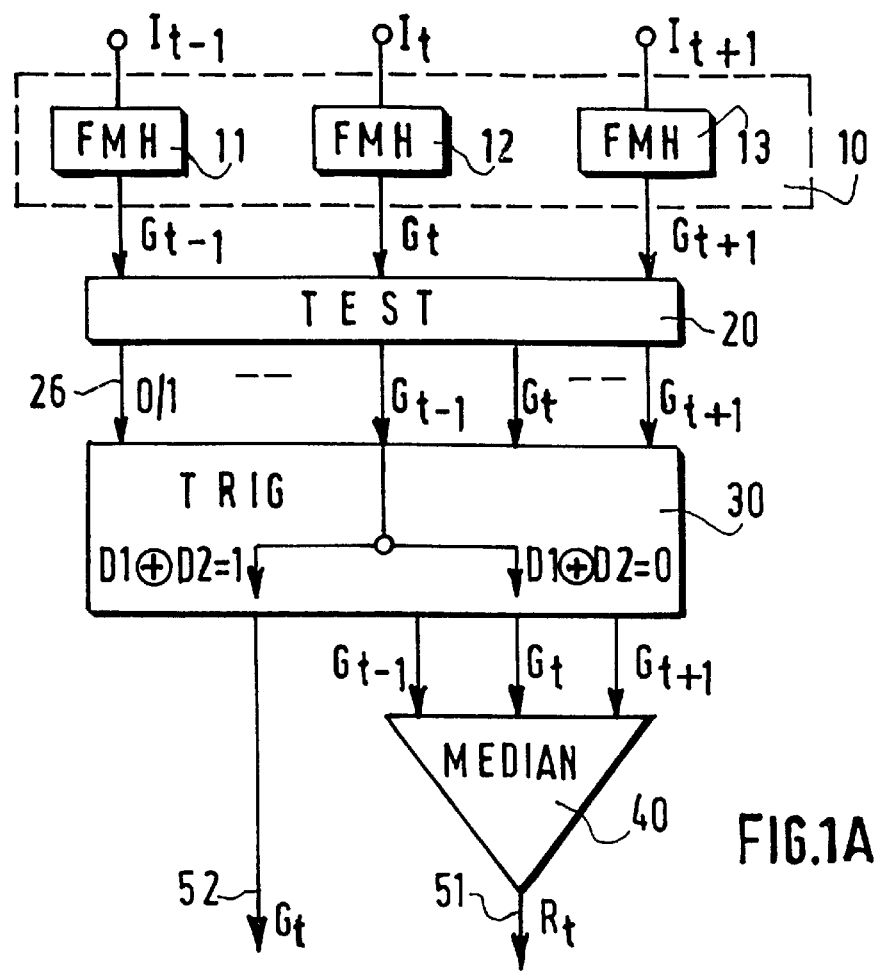
FIG. 1A shows, in the form of functional blocks representing steps, the spatial filter having a temporal component FMH-3D according to the invention.

FIG. 1A illustrates the steps of an image processing method for reducing the noise in an image while preserving the small details, such as an image, a catheter which may have a diameter of less than 10 pixels. Moreover, this method is very resistant to motion, i.e. it reduces the noise in the images of a sequence of images while suitably preserving the small details of a moving object from one image to another, in particular a small object such a moving catheter.

The method can be used notably for sequences of X-ray images obtained in the fluoroscopy mode in which the intensity of the X-rays from a source for forming the images is very low and in which the images are very noisy. These images contain noise as well as noise peaks. The method can also be used for television images to be encoded. The video images contain noise with high frequencies; even if the noise is not disturbing per se, it is difficult and expensive to encode the high frequencies; therefore, the noise is preferably extracted from the video images prior to their encoding.

Figure 2A:
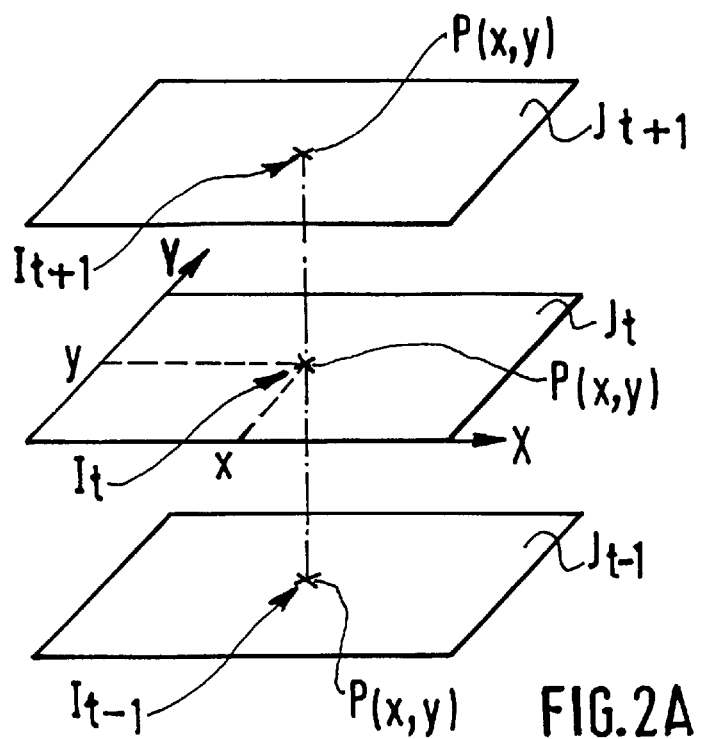
FIG. 2A shows three successive images of a sequence of images and FIG. 2B illustrates a measurement of the standard noise deviation.

Referring to FIG. 2A, the method described hereinafter is preferably performed while using three successive temporal images. The image arriving first in time is referred to as $J_{t-1}$ and called a causal image; the image arriving second in time is referred to as $J_t$ and called a present image; the image which arrives as the third image in time is as $J_{t+1}$ and called an anticausal image. Let a pixel P(x,y) be referenced by its co-ordinates x,y in a system of axes X,Y in these images. The method of filtering the intensity $I_{t(x,y)}$ of the pixel P(x,y) in the present image $J_t$ is performed with the aid of the intensity $I_{t-1(x,y)}$ and $I_{t+1(x,y)}$ of the same pixel in the causal and anticausal images. These intensities will be referred to hereinafter as $I_t$, $I_{t-1}$ and $I_{t+1}$ for the sake of simplicity.

Referring to the FIGS. 1A, 3A to 3D and 4A and 4B, first a spatial filtering operation is performed on each of the three successive images of the sequence while utilizing, for example one of the purely spatial filters FMH-1D or FMH-2D which are already known. This spatial filtering is intended to smooth each of the images individually in respect of noise peaks. The spatial filters are applied to the current pixel P(x,y) which is then the central pixel of the branches of the masks of these filters. Depending on the filters considered, said branches extend horizontally or vertically or even diagonally, i.e. they extend along rows or columns of the images or even along the diagonals of the rows and columns. The masks are formed by a few linearly arranged pixels. Masks consisting of two pixels offer very satisfactory results.

Figure 3A:
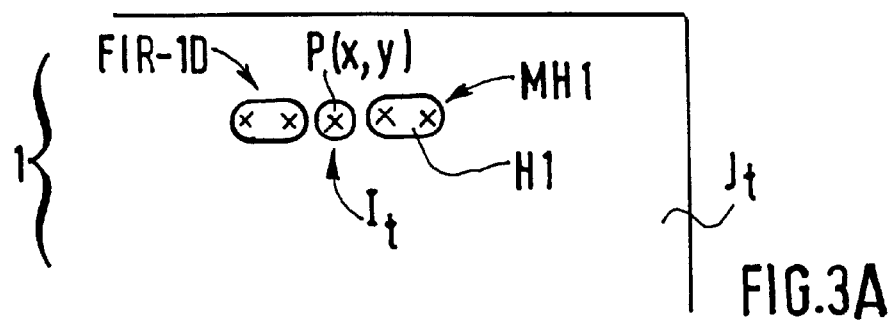
FIG. 3A shows a filter FIR-1D for implementing the filter FMH-1D of FIG. 4A.
Figure 3B:
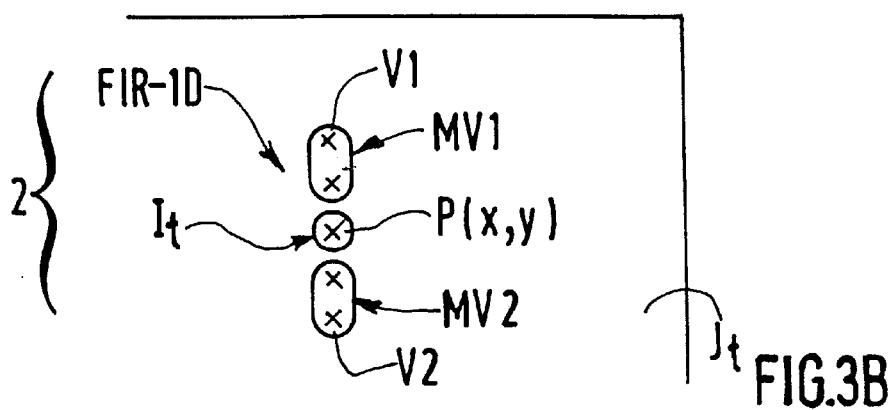
FIG. 3B shows a filter FIR-2D for implementing the filter FMH-2D of FIG. 4B.
Figure 4A:
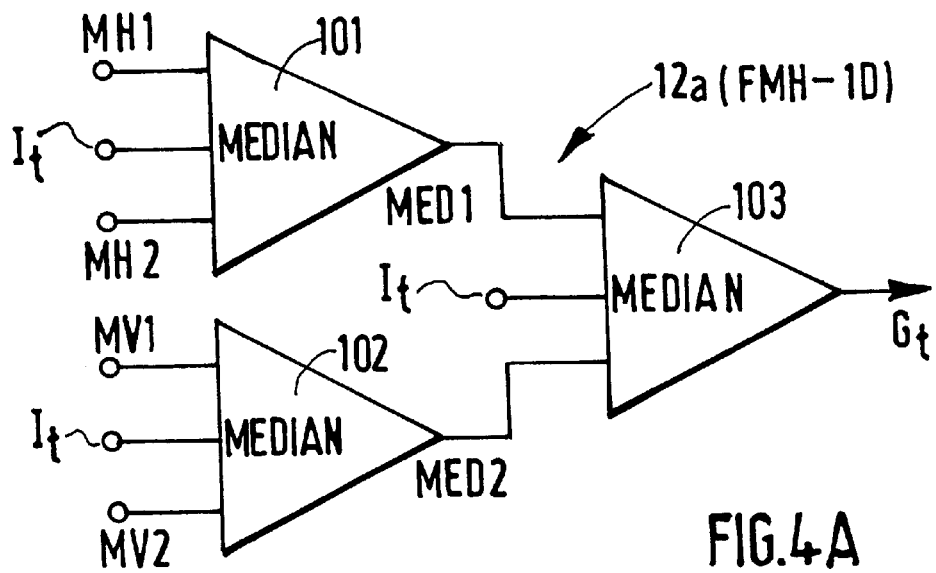
FIG. 4A shows a filter FMH-1D and FIG. 4B shows a filter FMH-2D.

As is shown in FIG. 4A, a spatial filter FMH-1D, applied to the present image $J_t$, includes a median filter 101 between the mean value MH1 of the intensity of the pixels in the branch H1 of the elementary filter FIR-1D, referred to as 1 and represented in FIG. 3A, the mean value MH2 of the intensity of the pixels in the branch H2, and the intensity $I_t$ of the central pixel P(x,y) in order to supply an intensity MED1. This spatial filter FMH-1D also comprises a median filter 102 between the mean value MV1 in the branch V1, the mean value MV2 in the branch V2 of the elementary filter FIR-1D, referred to as 2 and represented in FIG. 3B, and the intensity of the central pixel $I_t$ in order to supply an intensity MED2. This spatial filter FMH-1D then includes a median filter, referred to as 103, between the intensities MED1, MED2 and the intensity $I_t$ of the central pixel, thus supplying a spatially smoothed temporal intensity, referred to as $G_{t(x,y)}$, for the point P(x,y) having the co-ordinates x,y in the present image.

The same spatial filtering operations FMH-1D are also performed in the causal image and in the anticausal image in order to supply the two supplementary spatially smoothed temporal intensities $G_{t-1(x,y)}$ and $G_{t+1(x,y)}$. The smoothed temporal intensities $G_{t(x,y)}$, $G_{t-1(x,y)}$ and $G_{t+1(x,y)}$ are referred to hereinafter as $G_t$, $G_{t-1}$ and $G_{t+1}$ for the sake of simplicity. The branches of the elementary filter of FIG. 3B are rotated 90° with respect to those of the elementary filter of FIG. 3A. The median filter 103 is said to be connected in cascade with the median filters 101, 102.

Figure 3C:
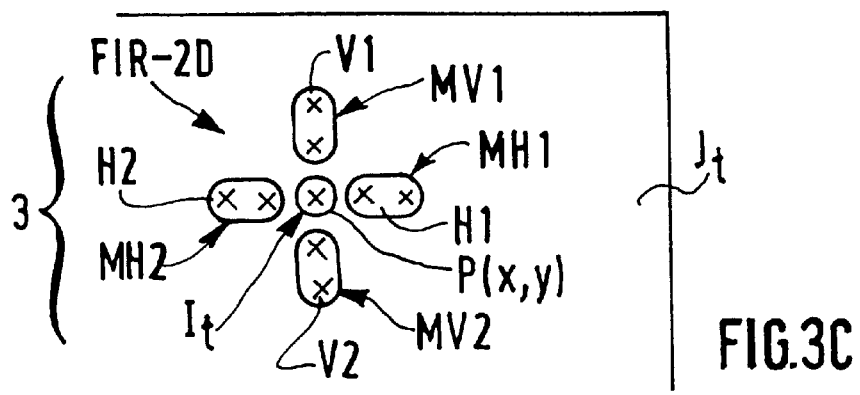
Figure 3D:
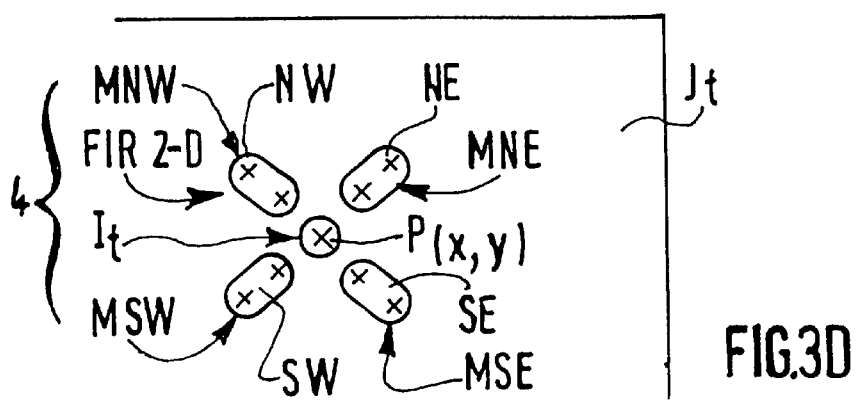
Figure 4B:
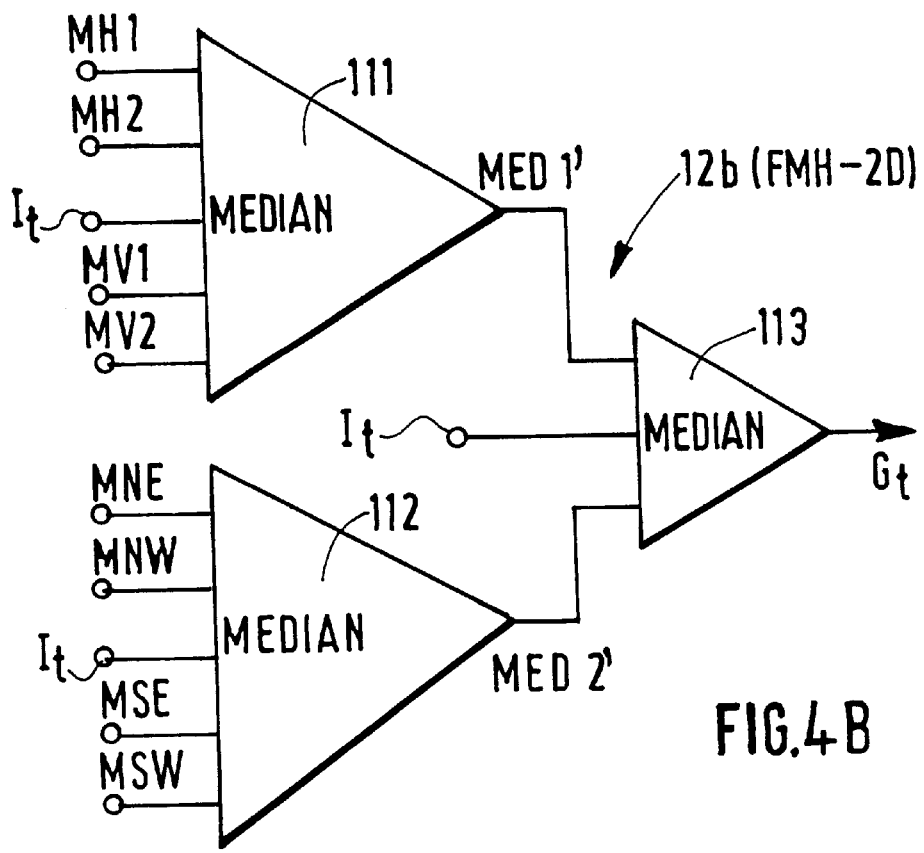

As is shown in FIG. 4B, a purely spatial filter FMH-2D, applied to the present image $J_t$, includes a median filter, referred to as 111, between four mean intensities MH1, MH2, MV1, MV2 in the branches H1, H2, V1, V2, respectively, of an elementary spatial filter FIR-2D, referred to as 3 and shown in FIG. 3C, and the intensity $I_t$ of the central pixel in order to supply an intensity MED1'. Subsequently, the spatial filter FMH-2D of FIG. 4B includes a median filter, referred to as 112, between four mean intensities MNE, MNW, MSE, MSW of the branches NE, NN, SE, SW, respectively, of an elementary spatial filter FIR-2D, referenced to as 4 and shown in FIG. 3D, and the intensity $I_t$ of the central point. The branches of the filter of FIG. 3D are rotated 45° relative to the branches of the filter of FIG. 3C. Subsequently, a median filter 113 is applied between the intensities MED1', MED2' and the intensity $I_t$ of the central pixel in order to supply a spatially smoothed temporal intensity $G_t$ for the point P having the co-ordinates x,y in the present image $J_t$. Carrying out analogous operations in the causal image $J_{t-1}$, and in the anticausal image $J_{t+1}$ yields the other two spatially smoothed temporal intensities $G_{t-1}$ and $G_{t+1}$ for the three successive images of the sequence.

Numerous other combinations of elementary spatial filters FIR-1D or FIR-2D, with median filters arranged in a cascade in one or several levels as disclosed in the cited document describing the state of the art, are feasible so as to form purely spatial filters called FMH.

Referring to FIG. 1A, a spatial filter structure FMH is chosen and applied, in the form of blocks called 11, 12, 13, to a given current pixel P(x,y) in each of the three successive images $J_{t-1}$, $J_t$, $J_{t+1}$ in order to replace the original temporal intensities $I_{t-1}$, $I_t$, $I_{t+1}$ by the temporal intensities spatially smoothed in respect of noise peaks, $G_{t-1}$, $G_t$, and $G_{t+1}$.

Figure 8:
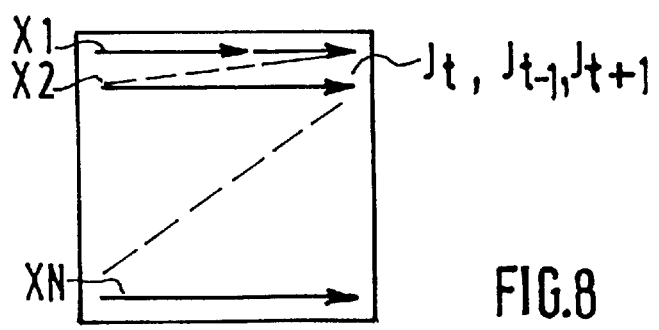
FIG. 8 illustrates a standard method for scanning the image to be processed.

Referring to FIG. 8, the method is rendered automatic by scanning each image $J_{t-1}$, $J_t$, $J_{t+1}$ in a standard and systematic manner, for example from left to right and from top to bottom, parallel to the axis X of the image, along scanning lines X1, X2 . . . , XN . . . etc.

It is to be noted that a median filtering operation offers an advantage over the formation of a mean value. This advantage resides in the fact that the result of the median filter is not biased by an atypical intensity deviation at one of its inputs. A mean value formed of intensities which include one which has an atypical standard deviation with respect to the others is biased by the presence of this atypical value. Therefore, the use of spatial filters FMH on the basis of median filters is particularly interesting.

Referring to FIG. 1A, the following steps 20, 30, 40 of the method consist in selecting a spatially smoothed temporal intensity value and in attributing it to the current pixel P(x,y) in the present temporal image $J_t$.

Figure 2B:
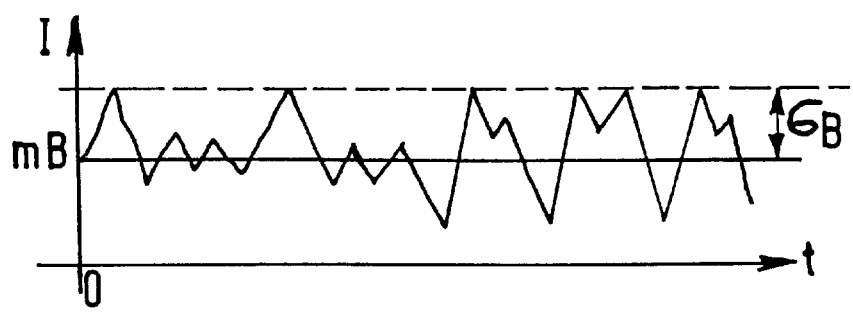

To this end, two quantities are defined. Referring to FIG. 2B, the first quantity is the standard noise deviation, referred to as $\sigma_B$, with respect to the mean value of the noise, referred to as $m_B$. The standard noise deviation $\sigma_B$ can be determined a priori as a value of a given number of intensity levels, for example 15 intensity levels from 256 intensity levels, or it can also be determined by any other suitable method known to those skilled in the art. FIG. 2B shows the level of the mean intensity $m_B$ which is supposed to be constant as a function of time t, and the variations of the noise which determine a standard deviation $\sigma_B$ with respect to this mean value, measured along an intensity axis I.

The second quantity is a proportionality constant K. The factor obtained by the product $K \times \sigma_B$ is called the noise suppression factor and constitutes a threshold which is empirically controlled so as to achieve the noise suppression desired by the user.

Figure 1B:
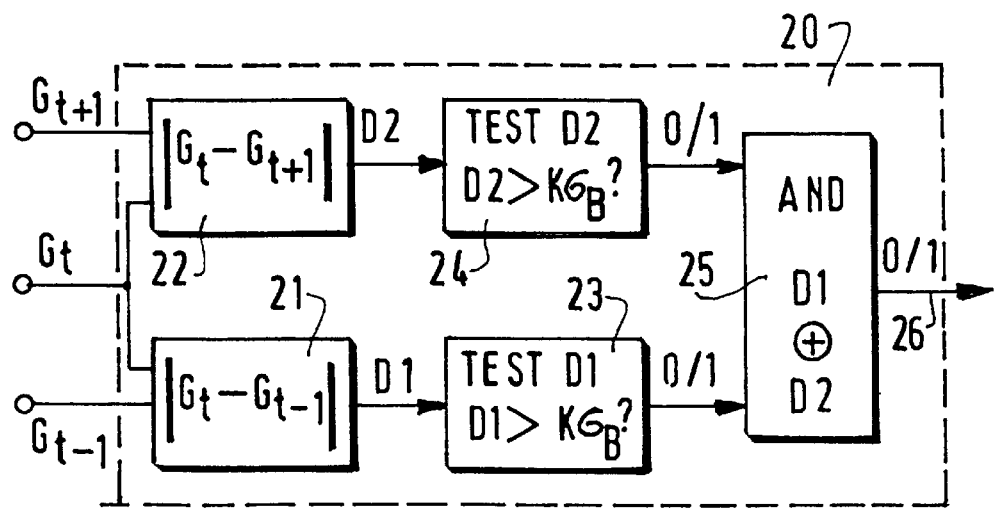
FIG. 1B shows the functional block TEST of the filter of FIG. 1A.

During the second step 20, the sub-steps illustrated in FIG. 1B are carried out in order to detect on the one hand a first case in which the temporal intensity $G_t$ deviates strongly from the other two temporal intensities $G_{t-1}$ and $G_{t+1}$, and to detect on the other hand a second case in which the temporal intensity $G_t$ is substantially equal to at least one of the other two temporal intensities $G_{t+1}$ and $G_{t+1}$. This operation enables separation of two situations, being:

the movement of a small object (passing-by movement), the movement of an extended object, having a shape which is called a "plateau" (plateau motion).

Figure 5A:
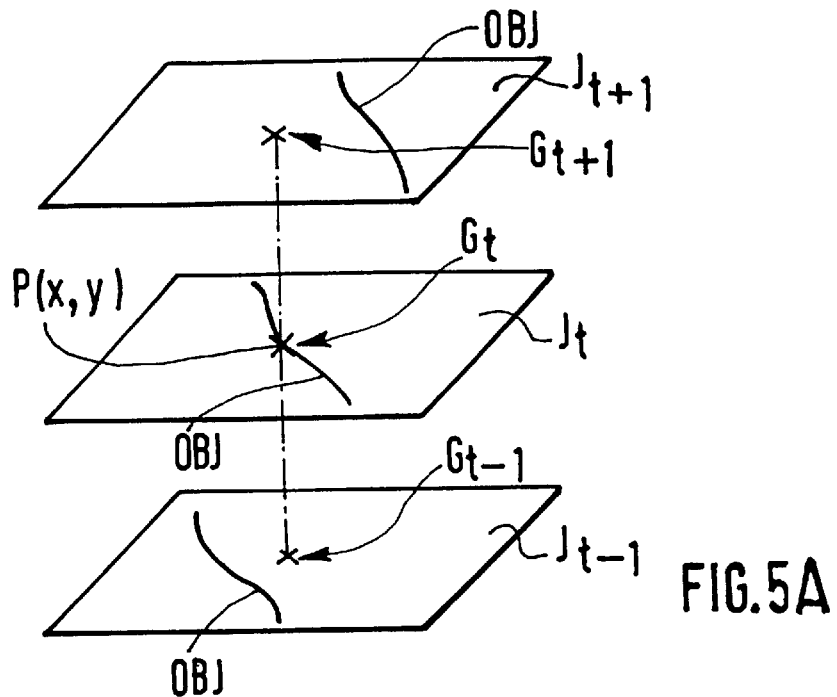
FIG. 5A shows three successive images of a sequence of images which contain a small moving object.
Figure 5B:
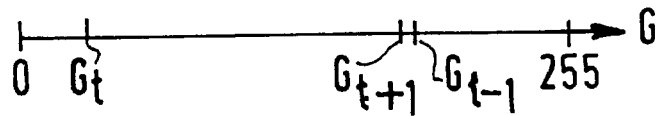
FIG. 5B shows the classification of the intensities relating to the images of FIG. 5A for the selection by a median.

FIG. 5A shows the effect of the movement of a small object, referred to as OBJ, between the three images $J_{t-1}, J_t, J_{t+1}$. In the image $j_{t-1}$, the small object OBJ is not on the pixel P(x,y), but it is present in the image $G_t$ and no longer present in the image $J_{t+1}$. Therefore, the spatially smoothed temporal intensity $G_t$ deviates very much from the other spatially smoothed temporal intensities $G_{t-1}$ and $G_{t+1}$. FIG. 5B shows the classification of these temporally smoothed intensities $G_{t-1}, G_t, G_{t+1}$ on an intensity axis G, where 0 corresponds to the minimum intensity or black in the image and where 255 corresponds to a high intensity or white.

FIG. 6A shows the effect of the movement of a "plateau", referred to as PT, between the three images $J_{t-1}, J_t, J_{t+1}$. In the image $J_{t-1}$, given merely by way of example, the plateau PT has not yet reached P(x,y) but it is present in the image $J_t$ and it is also present in the image $J_{t+1}$. Therefore, referring to FIG. 6B, in the case of a plateau the intensity $G_t$ in the image $J_t$ is generally at least substantially the same as that of the preceding image or even that of the next image.

It appears from the FIGS. 6A, 6B that it is not desirable to select one of the intensities $G_t, G_{t-1}, G_{t+1}$ systematically for the pixel P(x,y) by applying a median, because the result offered by this median is systematically false in the case of movement of the small object, because the median will select a value which is very remote from $G_t$.

In order to avoid such an error, the present method performs, in this step 20 called TEST, a selection of the two described situations. These two situations are selected by the implementation of two branches of sub-steps as illustrated in FIG. 1B:

In the first branch, the absolute value D1 of the difference between $G_t$ and $G_{t-1}$ is calculated in a first sub-step 21, after which it is compared with the noise suppression factor $K\sigma_B$ in a second sub-step 23 by testing D1 in conformity with the formula:

$$|G_t - G_{t-1}| > K\sigma_B?$$

The result, YES or NO, obtained at the end of the second sub-step 23 is applied to the first input of a logic AND-gate which is denoted by the reference 25 in FIG. 1B.

In the second branch, the absolute value D2 of the difference between $G_t$ and $G_{t+1}$ is calculated in a first sub-step 22, after which it is compared with the noise suppression factor $K\sigma_B$ in a second sub-step 24 by testing D2 in conformity with the formula:

$$|G_t - G_{t+1}| > K\sigma_B?$$

The result, YES or NO, obtained at the end of the second sub-step 24 is applied to the second input of the logic AND-gate of FIG. 1B, constituting a third sub-step which is common to the two branches of the test step 20.

FIG. 7 shows the effect of the logic AND-gate 25 on the inputs YES or NO. The YES and the NO are represented by a signal 1 and a signal 0, respectively.

The output of the logic AND-gate 25 is subjected to a step which is called TRIG and is denoted by the reference 30 in FIG. 1A; it triggers:

either the action of a median filter 40 in order to perform a selection $R_t$ from among the three temporal intensities $G_t, G_{t-1}$ and $G_{t+1}$, or the automatic selection of the temporal value $G_t$ in order to apply it as the filtered temporal intensity value $R_t$ for the current pixel P(x,y) of the present image $J_t$.

Referring to FIG. 7, the logic AND-gate has an output 1, that is to say YES, exclusively in the case where the inputs are both equal to 1, corresponding to two inputs YES according to which the two absolute values D1 and D2 of the differences $|G_t-G_{t-1}|$ and $|G_t-G_{t+1}|$ are both greater than $K\sigma_B$. This signifies that $G_t$ is a temporal intensity value which strongly deviates from $G_{t-}$ and $G_{t+1}$, corresponding to the case of fugitive motion of a small object OBJ as shown in FIG. 5A. The step TRIG, denoted by the reference 30, then triggers the direct selection of $G_t$ as the filtered temporal intensity value $R_t$ for P(x,y) in $J_t$, because a median filter would produce an intensity value which would erase the small object performing the fugitive motion as explained above.

In all other cases, where at least one of the two inputs of the AND-gate equals zero, the output equals zero, corresponding to one input YES and one input NO; in that case only one of the two absolute values D1, D2 of the differences $|G_t-G_{t-1}|$ and $|G_t-G_{t+1}|$ is greater than $K\sigma_B$. Referring to FIG. 6B, this means that $G_t$ is an intensity value which is close to either $G_{t-1}$ or $G_{t+1}$, the other intensity value being more remote. Thus, a movement of the "plateau" PT (plateau motion) according to FIG. 6A is concerned. The step 30, referred to as TRIG, then triggers a median filter 40 for which the inputs are the three temporal intensities $G_t, G_{t-1}$ and $G_{t+1}$ and for which the output is the value $R_t$ which is the filtered temporal intensity value to be applied to the pixel P(x,y) in the present image $J_t$. For $R_t$, this median chooses the value $G_t$ or rather that of the two values between $G_{t-1}$, and $G_{t+1}$ which, during the sub-steps 23, 24, has yielded an absolute value of the difference with $G_t$ small, i.e. an answer NO to the question: |difference|>threshold $K\sigma_B$.

It follows from the foregoing description that there is a case in which a fugitive movement of a small object occurs in a zone of the image in which the pixels relating to this small object are filtered only by a single spatial filtering operation for smoothing the noise peaks. In all other cases, that is to say in all other zones of the image, it is desirable that the pixels of the image are subjected to two successive filtering operations: a first spatial filtering operation and a second temporal filtering operation. The so-called TEST operation, enabling a decision to be made as to whether a restriction will be made to this single spatial filtering for a given pixel or whether two successive filtering operations are to be applied, therefore, is very important.

Actually, a filtering operation limited to the single filter FMH-1D or 2D may introduce the aforementioned noise patches and patterns in the zone which encloses the pixel being processed, because the elementary filters of the FMH favor given directions more than others in the zone considered. Therefore, the so-called TEST operation is based on the adjustable noise suppression factor $K\sigma_B$.

For adjustment of the factor $K\sigma_B$ by way of the control means for K, therefore, it is necessary to take into account:

If K is too small, the TESTS always yield an answer YES, and one can never pass the temporal median. The filtering then always remains purely spatial, the consequences being as described above.

If K is too large, the TESTS always yield an answer NO and there will always be the median operation at the output, involving the risk of erasure of the fugitive movements of small objects.

When the parameter K is correctly adjusted, the method preserves the small objects in furtive motion while excluding the temporal median from the processing of the pixels of the small object in motion, and the method applies the spatial filtering, followed by the temporal median for the processing of all other pixels of the image. As the method is applied one pixel after the other, when the median is not triggered and only the spatial filtering is applied, exclusively some pixels which represent the small object in motion will be involved. The other zones of the image are subjected to the two filtering operations, i.e. the spatial filtering followed by the temporal median.

On the other hand, it is equally important that the factor K is applied to the standard noise deviation $\sigma_B$ in such a manner that the operation TEST takes into account the noise level in the image. Otherwise it is not easy to detect a small object without taking into account the noise.

The method described above enables simple filtering of the temporal images of a long sequence of images, one image after the other, while utilizing for the filtering of a given image the data acquired during the filtering of preceding images. In reality, as from the fourth image $J_{t+2}$ arriving in the sequence of images, after $J_{t+1}$, there have already been obtained two results of the filters FMH, already calculated for $J_t$ and $J_{T+1}$. Therefore, each arrival of a new image in the sequence requires a calculation of FMH which is referred to as 11, 12, 13, a calculation of the median 100, 102, 103 or 111, 112, 113, and two TESTS. These operations can be performed in real time. In order to carry out this method, use can be made of a known processor which is called "DIGITAL SIGNAL PROCESSOR DSP-C80". For images comprising 512×512 pixels the steps are carried out by this processor in 15 ms. Thus, the images come by at the rate of one image every 40 ms in the case of a sequence of 25 images per second. Therefore, the images are readily processed in real time.

In as far as the filtering factor or threshold $K\sigma_B$ is concerned, it can be tabulated and the logic AND-gate has been known for a long time to those skilled in the art. The filter described with reference to the FIGS. 1A and 1B, therefore, can be readily implemented. It offers the advantage that it does not involve multiplication. During the steps of the filter according to the invention, being a spatial filter with temporal components, the purely spatial FMH 11, 12, 13 suppress the noise in the image $J_t$ and notably eliminate the noise peaks. However, these spatial filters occasionally leave behind patches or noise patterns which are due to the shape of the masks of the elementary spatial filters 1, 2, 3 or 4 (FIGS. 3A–3D). According to the present method, the median filter 40, subsequently applied in a temporal manner to the already filtered temporal intensities $G_t$, $G_{t-1}$ and $G_{t+1}$, suppresses the noise more strongly in the image and completely suppresses the noise patches. Generally speaking, the filter represented in the FIGS. 1A and 1B is very resistant to the fugitive motion of a small object and hence solves the problem described with reference to the FIGS. 5A and 6A.

Figure 9:
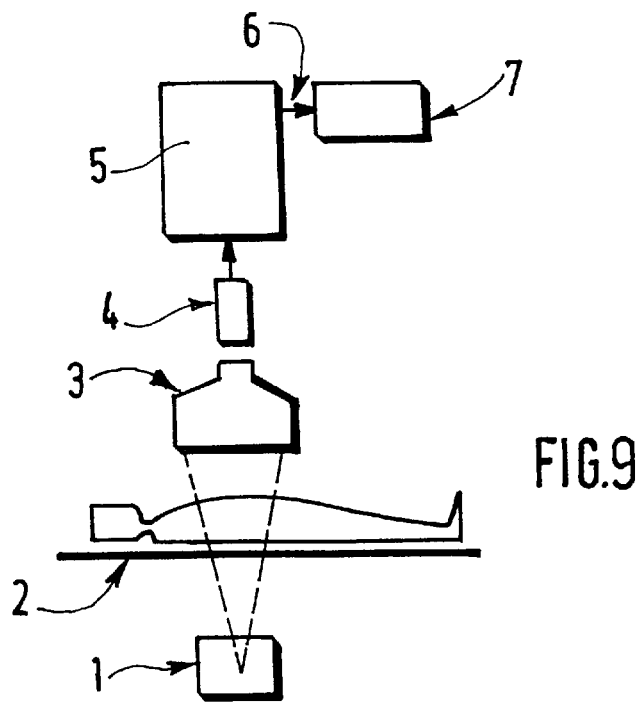
FIG. 9 shows a medical imaging apparatus for carrying out the method.

FIG. 9 shows, by way of example, a medical imaging apparatus which includes a digital radiography system with means for carrying out the noise reduction method described above. The apparatus includes an X-ray source 1, a table 2 for accommodating the patient, a device for receiving the X-rays having traversed the patient, and notably an image intensifier device 3 which is coupled to a camera tube 4 which applies data to an image processing system 5 which includes a microprocessor. The latter has several outputs, including an output 6 which is coupled to a monitor 7 for the display of the images, or sequences of images, processed or to be processed.

The digital radiographic image may contain 512×512 or 1024×1024 pixels encoded in 8 bits or 10 bits. Each pixel may thus be assigned one from 256 or 1024 intensity levels. For example, the dark regions have a low intensity level and the bright regions of the image have a high intensity level.

The digital image can be obtained in the fluoroscopy mode. The invention can be used particularly for the processing of arteriographic images.

The various steps and operations of the digital image processing by means of the method described above are carried out in the system 5. The data can be stored in a memory zone (not shown). Recording means (not shown) may also be used.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An image processing method for reducing the noise in an image ($J_t$), comprising determining three temporal intensities relating to a current pixel (P(x,y)) in the same location (x,y) in three successive images ($J_{t-1}$, $J_t$, $J_{t+1}$) in a sequence, the image to be processed being the central image ($J_t$) of the sequence testing of three temporal intensities ($G_{t-1}$, $G_t$, $G_{t+1}$, previously smoothed for noise peaks, in order to distinguish a first case in which the smoothed temporal intensity ($G_t$) in the central image ($J_t$) is substantially different from the other two smoothed temporal intensities ($G_{t-1}$, $G_{t+1}$) from a second case in which the smoothed temporal intensity ($G_t$) in the central image ($J_t$) is substantially equal to at least one of the other two smoothed temporal intensities ($G_{t-1}$, $G_{t+1}$), and assigning a noise filtered intensity ($R_t$) to the current pixel (P(x,y)) in the central image ($J_t$) which in the first case is directly the smoothed temporal intensity ($G_t$) at the current pixel in the central image and which in the second case is the result of a temporal median filter applied to the three smoothed temporal intensities ($G_{t-1}$, $G_t$, $G_{t+1}$) in the second case.

2. A method as claimed in claim 1, wherein said testing further comprises:

determination of two differences (D1, D2) which are formed by the absolute values of the differences between the smoothed temporal intensity in the central image ($G_t$) and the smoothed temporal intensities in the other two images ($G_{t-1}$, $G_{t+1}$), determination of a threshold ($K\sigma_B$), comparison of each of the differences with said threshold, and triggering of the assignment of the noise filtered intensity ($R_t$) either in conformity with said assigning step carried out in said first case if the two differences (D1, D2) both exceed said threshold, or in conformity with said assigning step carried out in said second case if no more than one of said differences exceeds said threshold.

3. A method as claimed in claim 2, in which the threshold ($K\sigma_B$) is a noise suppression factor obtained as the product of an adjustable factor (K) and the standard noise deviation ($\sigma_B$) with respect to the mean value of the noise in the image.

4. A method as claimed in claim 1 wherein the smoothing of the intensities of the three successive images for noise peaks is performed spatially and individually for each of the three images.

5. A method as claimed in claim 4, in which the smoothing of the intensities of the three successive images ($J_{t-1}, J_t, J_{t+1}$) is performed individually by means of a two-dimensional spatial filter which includes one or more spatial median filters which are applied in cascade to one or more mask structures with a finite impulse response.

6. A method as claimed in claim 4, in which the smoothing of the intensities of the three successive images ($J_{t-1}, J_t, J_{t+1}$) is performed individually by means of a one-dimensional spatial filter which includes one or more spatial median filters which are applied in cascade to one or more of the mask structures with a finite impulse response.

7. A method as claimed in claim 1 further comprising automatically scanning the images in a standard manner, one pixel after the other, and in which the steps of determining, testing, and assigning are carried out automatically for each pixel.

8. A medical imaging apparatus comprising:
a system for the acquisition of a sequence of digital images,
an image processing system which has access to the data of the image acquisition system,
a display system, and
a processor for carrying out a method as claimed in claim 1.

9. The method of claim 3 wherein the adjustable factor (K) is selected to limit exclusion of application of the temporal median filter to the case where a small object in furtive motion is represented in a zone of the image to be processed.

10. The method of claim 2 wherein the smoothing of the intensities of the three successive images for noise peaks is performed spatially and individually for each of the three images.

11. The method of claim 10 wherein the smoothing of the intensities of the three successive images ($J_{t-1}, J_t, J_{t+1}$) is performed individually by means of a two-dimensional spatial filter which includes one or more spatial median filters which are applied in cascade to one or more mask structures with a finite impulse response.

12. The method of claim 10 wherein the smoothing of the intensities of the three successive images ($J_{t-1}, J_t, J_{t+1}$) is performed individually by means of a one-dimensional spatial filter which includes one or more spatial median filters which are applied in cascade to one or more of the mask structures with a finite impulse response.

* * * * *